Patented Jan. 23, 1934

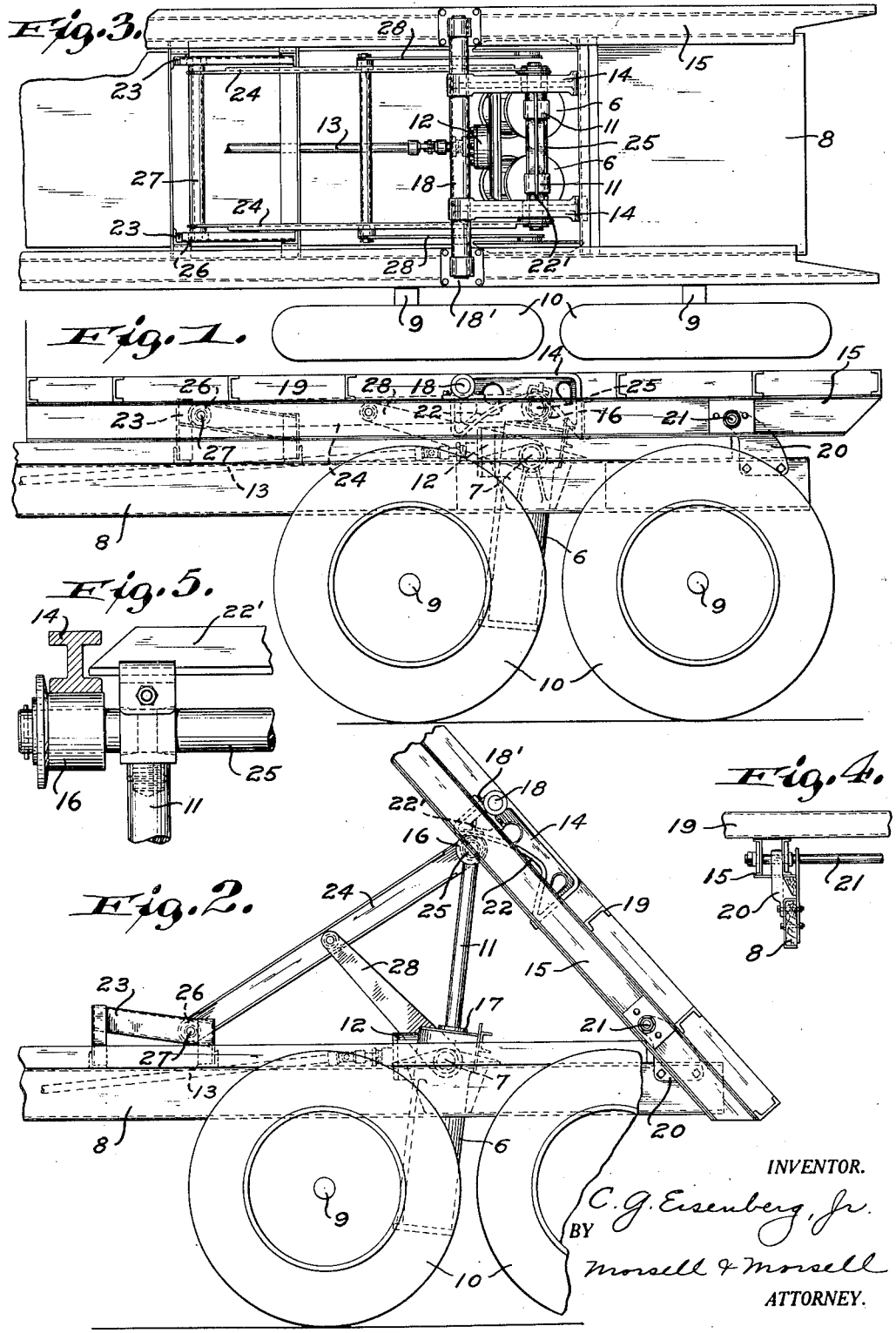

1,944,414

UNITED STATES PATENT OFFICE 1,944,414

DUMPING MECHANISM

Charles G. Eisenberg, Jr., Wauwatosa, Wis., assignor to The Heil Co., Milwaukee, Wis., a corporation of Wisconsin Application October 12, 1931. Serial No. 568,243

7 Claims. (Cl. 298—22)

The present invention relates in general to improvements in the art of hauling and dumping materials, and relates more specifically to improvements in the construction and operation of mechanism especially adapted to tilt a body pivotally associated with a vehicle.

Generally defined, an object of the invention is to provide an improved body tilting mechanism which is simple in construction and efficient in operation.

In the manufacture of so-called dump trucks, it is common practice to utilize a hydraulic hoist comprising one or more cylinders mounted upon the truck chassis beneath the dump body, and pistons movable within the cylinders and having rods coacting with the body to tilt the same. The cylinders are ordinarily pivotally supported upon horizontal trunnions disposed at the upper cylinder ends, and the lower cylinder ends extend downwardly from the trunnion axis toward the ground and are frequently located near the rear truck axle or other chassis structure. While the hoist structure is usually simplified by permitting the hoisting cylinders to swing about their supporting trunnions and by pivotally connecting the upper ends of the piston rods directly to the body, such swinging of the cylinders is not permissible in certain types of trucks, since there is not sufficient available clearance between the cylinders and the adjacent chassis structure to permit the necessary movement of the cylinders. It is, however, extremely desirable to enable the use of the same standard type of hoist in conjunction with all designs and types of vehicles, in order to simplify the manufacturing problems and reduce the costs to a minimum.

A more specific object of the present invention is to provide improved means whereby a standard trunnion supported hoist may be utilized to effectively operate a dump body mounted upon a standard truck of any design or type, without introducing interference between parts of the structures.

Another specific object of the invention is to provide simple and efficient mechanism for preventing undesirable displacement of the cylinder or cylinders of a trunnion supported hoist, and of a body being tilted by the hoist.

A further specific object of the invention is to provide simple and compact structure for bracing the piston rod or rods of a fluid actuated hoist, and for preventing undesirable lateral displacement of the rods.

Still another specific object of the invention is to provide instrumentalities for permitting convenient location of dump body tilting mechanism, at the most desirable position upon a supporting vehicle with which the mechanism cooperates.

Another specific object of the invention is to provide a hoist which may be interchangeably utilized either with its rod fixedly pivoted to the body so as to permit swinging of the cylinder during dumping, or with its rod slidably cooperable with the body and the cylinder fixed against displacement during tilting of the body.

These and other objects and advantages will be apparent from the following detailed description.

A clear conception of one embodiment of the invention and of the mode of constructing and operating dumping mechanisms in accordance therewith, may be had by referring to the drawing accompanying and forming a part of this specification in which like reference characters designate the same or similar parts in the several views:

Fig. 1 is a side elevation of one of the improved dumping mechanisms, showing the same applied to the rear end of a standard truck and with the body lowered;

Fig. 2 is another side view of the dump truck structure showing the body in extreme tilted position;

Fig. 3 is a fragmentary top view of the assemblage illustrated in Figs. 1 and 2;

Fig. 4 is a fragmentary rear view showing the details of construction of one of the rear body pivots and Fig. 5 is an enlarged part sectional view showing the mechanism for preventing abnormal tilting of the body.

Referring to the drawing, the specific embodiment of the invention therein illustrated comprises in general a pair of rigidly united parallel cylinders 6 pivotally suspended through trunnions 7 from the truck chassis frame 8 near the rear axles 9 and drive wheels 10; pistons having parallel rods 11 simultaneously movable upwardly within the cylinders 6 by fluid under pressure supplied by a common pump 12 driven by the vehicle motor through a shaft 13; special brackets 14 carried by the body support 15 and coacting with rollers 16 rotatably mounted upon the upper ends of the rods 11; and linkage for simultaneously bracing the piston rods 11 and for preventing undesirable displacement of the cylinders 6 at all times.

The piston displacement chambers of the cylinders 6 are in open communication with each other so as to permit slight differential movement of the piston rods 11, and these rods are reciprocable in stuffing boxes 17 associated with the upper ends of the cylinders 6. The trunnions 7 are disposed at the upper portions of the cylinders 6 and the lower cylinder ends extend toward the ground between the axles 9 and may interfere with the driving mechanism if these ends are permitted to swing forwardly. This location of the cylinders 6 relative to the chassis of the truck is, however, desirable in order to produce the best lifting effect upon the body. The construction of the pump 12 and the mode of driving the same through the shaft 13 to elevate the pistons, is well known to those skilled in the art, and the pistons of the hoist are lowered in a well known manner by the weight of the body or with the aid of a spring, when the fluid pressure beneath the pistons is released.

The special brackets 14 may be rigidly attached by a pin 18 coacting with brackets 18' to the medial portion of the body support 15 upon which the floor 19 of the dump body is directly mounted, and the rear end of the support 15 is tiltably mounted upon brackets 20 attached to the chassis frame 8 by means of a pivot 21. The lower surfaces 22 of the brackets 14 which coact with the rod supported rollers 16, are cam shaped or curved as shown, so that when the rollers ride along the surfaces 22 during elevation of the dump body, most effective lifting effort is at all times applied to the body support 15 without lateral displacement of the piston rods 11. In order to prevent the body and the brackets 14 from tilting upwardly away from the piston rod ends during dumping, a T-iron 22' is secured to the piston rod heads as shown in Fig. 5, and the ends of this T-iron are caused to extend over the lower flanges of the brackets 14.

In cases where swinging of the cylinders 6 and piston rods 11 about the trunnions 7 is permissible, the brackets 14 may be omitted and the upper ends of the piston rods 11 may then be connected directly to the cross-pin 18 the supporting brackets 18' of which may in that case be shifted toward or away from the body pivot 21 so as to cause the cylinders 6 and piston rods 11 to swing within the desired limits.

The linkage which is utilized in cases where lateral displacement of the rods 11 and swinging of the cylinders 6 is to be avoided, comprises a set of guides 23 secured to the opposite sides of the chassis frame 8 forwardly of the trunnions 7, levers 24 having their rear ends pivotally attached to the ends of the cross-shaft 25 upon which the rollers 16 are mounted and which is engaged by the piston rods 11, rollers 26 carried by a pin 27 secured to the forward ends of the levers 24 and coacting with the adjacent guides 23, and arms 28 pivotally connecting the medial portions of the levers 24 with the corresponding trunnions 7. This linkage while permitting free reciprocation of the piston rods 11 within the cylinders 6, causes these rods to move along their axes only and thereby prevents lateral displacement of the piston rods and swinging of the cylinders 6 about their trunnions 7. The guides 23 are disposed radially of the trunnion axis and guide the rollers rectilineally, and by providing two independent sets of the linkage, the piston rods 11 are permitted to move differentially in cases where unequal pressures are applied. The cross-shaft 25 preferably has a loose fit in the eyes at the upper ends of the piston rods 11 in order to permit slight tilting of this shaft during differential displacement of the rods, and the linkage which prevents swinging of the cylinders 6 by virtue of its coaction with the trunnions 7 and with the upper ends of the piston rods 11, also serves to brace or stabilize the piston rods during movement thereof out of the cylinder 6.

During normal use of the vehicle or truck, the dump body is resting upon the chassis frame 8 as shown in Figs. 1 and 3, and the hoisting mechanism is inactive with the piston rods 11 in their lowermost position within the cylinders 6. The rod guiding and stabilizing linkages are collapsed as shown and the rollers 26 are disposed in the forward ends of the guides 23. When it becomes desirable to dump or tilt the body about the rear pivot 21, fluid which is preferably oil under pressure may be forced by the pump 12 into the piston displacement chambers of the cylinders 6, thereby causing the piston rods 11 to rise and to swing the body support 15 about the pivot 21 as indicated in Fig. 2. During such tilting of the truck body, the rollers 26 ride rearwardly along the guides 23 and the cam surfaces 22 advance rearwardly along the rollers 16, the piston rods 11 being compelled by the side levers 24 and arms 28 to move axially only and thereby preventing swinging of the cylinders 6 about their trunnions 7. In order to lower the dump body to normal material receiving or transporting position, it is only necessary to release the pressure in the piston displacement chambers of the cylinders 6, whereupon the weight of the body will force the piston rods 11 downwardly in an obvious manner. During such lowering operation, the rollers 26 ride forwardly along the guides 23 and the cam surfaces 22 advance forwardly along the rollers 16 which are again caused to travel only in the plane of the piston rod axes by the guiding linkages.

From the foregoing description it will be apparent that the present invention provides simple, compact and highly efficient means for preventing undesirable swinging of the cylinders 6 and for simultaneously bracing the piston rods 11. The use of the improved guiding and bracing linkage permits utilization of a standard trunnion supported hoist, without objectionable interference between the cylinders 6 and chassis structure, while permitting most desirable location of the hoist upon the vehicle. If the obstruction to swinging of the cylinders 6 is removed, the guiding linkage and brackets 14 may also be removed, and the hoist may then be converted into an ordinary swinging cylinder type by fixedly pivoting the piston rods to a cross-pin 18. The piston rod guiding linkage is disposed out of the way of other structure, and in no manner interferes with the differential movement of the piston rods 11, and the brackets 14 are effectively retained in position by the single pin 18 since they are constantly held in direct contact with the truck body by the rods 11. The cam surfaces 22 of the brackets 14 insure most effective application of the elevating pressures, and the brackets 14, levers 24, arms 28 and guides 23 may be manufactured and installed at moderate cost. The T-iron 22' also serves to effectively prevent separation of the rollers 16 and cam surfaces 22 due to inertia of the load, when the body reaches its maximum upper position as will be clearly apparent from Fig. 5.

It should be understood that it is not desired to limit the invention to the exact details of construction herein shown and described, for various modifications within the scope of the claims may occur to persons skilled in the art.

It is claimed and desired to secure by Letters Patent:

1. In combination, a frame, a cylinder pivotally suspended from said frame, a rod reciprocable within said cylinder, a body movable relative to said frame by said rod, a lever having one portion pivotally connected to said rod and having another portion slidably associated with said frame, and an arm pivotally connecting said lever with the supporting pivot of said cylinder.

2. In combination, a frame, a cylinder pivotally suspended from said frame, a rod movable within said cylinder, a body pivotally supported upon said frame and tiltable about its supporting pivot by said rod, a lever having one end pivotally connected to said rod and having its opposite end slidably connected to said frame, and an arm having one end pivotally connected to a medial portion of said lever and having its opposite end pivotally associated with the supporting pivot of said cylinder.

3. In combination, a frame, a pair of cylinders pivotally suspended from said frame upon a common pivotal axis, rods differentially movable within said cylinders, a body pivotally supported upon said frame and movable by said rods, and linkage cooperating directly with each of said rods and with the supporting pivot of the corresponding cylinder to prevent swinging of said cylinder during movement of said rod.

4. In combination, a frame, a pair of cylinders pivotally suspended from said frame and having a common pivotal axis, a rod movable within each of said cylinders, a body tiltable by said rods, a lever pivotally connecting each of said rods with said frame, and an arm pivotally connecting each of said levers with the pivotal support of an adjacent cylinder.

5. In combination, a frame, a hoist suspended from said frame, said hoist comprising relatively reciprocable elements one of which is pivotally associated with said frame and the other of which is movable relatively to said pivoted element, a body movable relative to said frame by said movable hoist element, a lever having one portion pivotally connected to said movable hoist element and having another portion slidably associated with said frame, and an arm pivotally connecting said lever with the supporting pivot of said pivoted hoist element.

6. In combination, a frame, a hoist suspended from said frame, said hoist comprising relatively reciprocable elements one of which is pivotally attached to said frame and the other of which is movable relative to said pivoted element, a body pivotally supported upon said frame and tiltable about its supporting pivot by said movable hoist element, a lever having one end pivotally connected to said movable hoist element and having its opposite end movably connected to said frame, and an arm having one end pivotally connected to the medial portion of said lever and having its opposite end pivotally associated with the supporting pivot of said pivoted hoist element.

7. In combination, a frame, a hoist carried by said frame, said hoist comprising relatively reciprocable elements one of which is pivotally attached to said frame and the other of which is movable relative to said pivoted element, a body pivotally connected to said frame and tiltable about its supporting pivot by said movable hoist element, said movable hoist element having rolling contact with said body, a lever having one end pivotally connected to said movable hoist element adjacent to said body and having its opposite end slidably connected to said frame, and an arm having one end pivotally connected to the medial portion of said lever and having its opposite end pivotally associated with the supporting pivot of said pivoted hoist element.

CHARLES G. EISENBERG, Jr.